US006903736B1

(12) United States Patent
Stefan

(10) Patent No.: US 6,903,736 B1
(45) Date of Patent: Jun. 7, 2005

(54) VISUAL DISPLAY DEVICE AND METHOD OF MANUFACTURE

(76) Inventor: Tim Stefan, 13895 Kelly Canyon Rd., Bozeman, MT (US) 59715

( * ) Notice: Subject to any disclaimer, the term of this patent is extended or adjusted under 35 U.S.C. 154(b) by 136 days.

(21) Appl. No.: 10/179,653

(22) Filed: Jun. 25, 2002

(51) Int. Cl.[7] .................................................. G06T 15/00
(52) U.S. Cl. ......................... 345/419; 345/426; 345/581
(58) Field of Search ................................. 345/419, 426, 345/581

(56) References Cited

U.S. PATENT DOCUMENTS

| | | | | |
|---|---|---|---|---|
| 4,294,544 A | | 10/1981 | Altschuler et al. | |
| 5,136,515 A | | 8/1992 | Helinski | |
| 5,187,889 A | | 2/1993 | Kraselsky et al. | |
| 5,226,725 A | * | 7/1993 | Trusiani | 362/351 |
| 5,258,209 A | | 11/1993 | Bankert et al. | |
| 5,406,728 A | | 4/1995 | Willitts, Jr. | |
| 5,506,607 A | | 4/1996 | Sanders, Jr. et al. | |
| 5,711,099 A | | 1/1998 | Nesbit et al. | |
| 5,740,051 A | | 4/1998 | Sanders, Jr. et al. | |
| 5,841,441 A | | 11/1998 | Smith | |
| 5,945,985 A | * | 8/1999 | Babin et al. | 715/500.1 |
| 6,052,930 A | | 4/2000 | Hermanson et al. | |
| 6,084,592 A | | 7/2000 | Shum et al. | |
| 6,143,852 A | | 11/2000 | Harrison et al. | |
| 6,226,004 B1 | | 5/2001 | Nishihara | |
| 6,229,546 B1 | | 5/2001 | Lancaster et al. | |
| 6,271,855 B1 | | 8/2001 | Shum et al. | |
| 6,357,151 B1 | | 3/2002 | Yuen | |
| 2001/0027456 A1 | | 10/2001 | Lancaster et al. | |

FOREIGN PATENT DOCUMENTS

| | | |
|---|---|---|
| EP | 0 715 573 | 11/2001 |
| EP | 1 151 778 | 11/2001 |
| EP | 1 153 638 | 11/2001 |
| GB | 2 297 516 | 8/1996 |
| WO | WO 01/53105 | 7/2001 |

OTHER PUBLICATIONS

Rapid Prototyping Website (www.cc.utah.edu/~asn8200/rapid.html), pp. 1–12.

Solid Terrain Modeling, Inc. (Printed copy of Brochure (8 pgs.)).

Solid Terrian Modeling website (www.stm–usa.com), 16 pgs.

* cited by examiner

*Primary Examiner*—Kimbinh T. Nguyen
(74) *Attorney, Agent, or Firm*—Kagan Binder, PLLC

(57) ABSTRACT

A visual display device for displaying a three-dimensional replica of a geographic region. The visual display device preferably includes a transparent enclosure having an interior space. A three-dimensional replica of a geographic region is preferably positioned at least partially within the interior space of the enclosure so as to be viewable through the enclosure. In a preferred aspect of the present invention the three-dimensional replica of a geographic region comprises surface features proportionally corresponding to topographical data indicative of the three-dimensional topography of the geographic region. Also, in a preferred aspect of the present invention the interior space of the enclosure is at least partially filled with a fluid. Optionally, the interior space of the enclosure may include dispersible media capable of being at least partially dispersed throughout the fluid. In another aspect of the present invention, a method for forming a visual display device is provided. Generally, the method includes the steps of providing a transparent enclosure having an interior space, using information comprising data indicative of the three-dimensional topography a geographic region to fabricate a three-dimensional replica of a geographic region, positioning the three-dimensional replica of a geographic region at least partially within the interior space of the enclosure, and filling the interior space of the enclosure with a fluid.

34 Claims, 1 Drawing Sheet

VISUAL DISPLAY DEVICE AND METHOD OF MANUFACTURE

FIELD OF THE INVENTION

The present invention relates to a visual display device. In particular, the present invention relates to a visual display device having an enclosure, a three-dimensional replica of a geographic region positioned within the enclosure, and a fluid within the enclosure. Typically, the geographic region is at least partially submerged in the fluid. Preferred embodiments may be in the form of so-called "snow domes" or "snow globes" that optionally contain dispersible media that simulate snowfall when the device is agitated, although optional dispersible media in the fluid need not imitate snow.

BACKGROUND OF THE INVENTION

Typically, conventional ornamental displays, such as display globes, include a base onto which a figurine or other object to be displayed can be attached or otherwise positioned and a dome sealed to the base and surrounding the figurine or object. The seal between the base and the dome is usually fluid tight so that the interior of the display globe may be filled with water or other suitable liquid. Also, dispersible media, e.g., particles that imitate snow or the like, may be sealed within the dome. When the display globe is shaken or otherwise agitated, the dispersible media can become randomly and temporarily suspended in the liquid to simulate a snow scene or the like. Once the agitation has stopped, the dispersible media typically settle gradually to the base of the display globe. The settling effect simulates snowfall. One example of such a conventional display globe is described in U.S. Pat. No. 5,258,209. In that patent, a decorative display globe in the shape of a bell has figurines of a house, trees, and the like fixed to a base of the display. By grasping the handle of the display and shaking it, the dispersible media may become randomly and temporarily suspended in the liquid sealed in the decorative display to simulate a snow scene.

Commonly, the above-described ornamental display globes are used as novelty items. Because consumers generally desire that the cost of such novelty items be relatively low, objects to be displayed within such display globes are usually made by inexpensive manufacturing techniques. Such manufacturing techniques can result in products that lack sophisticated aspects of realism and geometric complexity. Accordingly, it would be desirable to be able to economically manufacture sophisticated and highly realistic objects to be displayed within such ornamental display globes.

SUMMARY OF THE INVENTION

The present invention provides a visual display device for displaying a realistic three-dimensional replica of a geographic region. In one form, the present invention provides an enclosure, which enclosure preferably includes an interior space. In an aspect of the present invention the enclosure includes a base for supporting and positioning the enclosure. Preferably, at least a portion of the enclosure is at least partially transmissive of light. A three-dimensional replica of a geographic region is preferably positioned at least partially within the interior space of the enclosure so that the three-dimensional replica of a geographic region is at least partially viewable through the portion of the enclosure that is at least partially transmissive of light. In a preferred aspect of the present invention, the three-dimensional replica of a geographic region comprises surface features corresponding to topographical data indicative of the three-dimensional topography of the geographic region. Also in a preferred aspect of the present invention a fluid, at least partially fills the interior space of the enclosure.

In another aspect of the present invention, a method for forming a visual display device is provided. Preferably, an enclosure having an interior space is provided wherein at least a portion of the enclosure is at least partially transmissive of light. Information comprising data indicative of the three-dimensional topography of a geographic region is used to fabricate a realistically proportional, three-dimensional replica of the geographic region. Also, the three-dimensional replica of a geographic region is preferably positioned at least partially within the interior space of the enclosure so that the three-dimensional replica of a geographic region is at least partially viewable through the portion of the enclosure that is at least partially transmissive of light. Preferably, the interior space of the enclosure is at least partially filled with a fluid. Optionally, dispersible media is included in the enclosure as well. Also, the enclosure may be supported by a base.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

The embodiments of the present invention described below are not intended to be exhaustive or to limit the invention to the particular embodiments disclosed in the following detailed description. Rather, the embodiments are described so that others skilled in the art can understand the principles and practices of the present invention.

Figure 1:
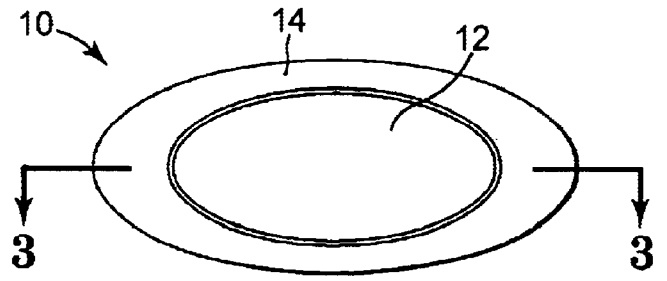
FIG. 1 is a schematic top view of a preferred visual display device of the present invention of the type including a base and an enclosure.
Figure 2:
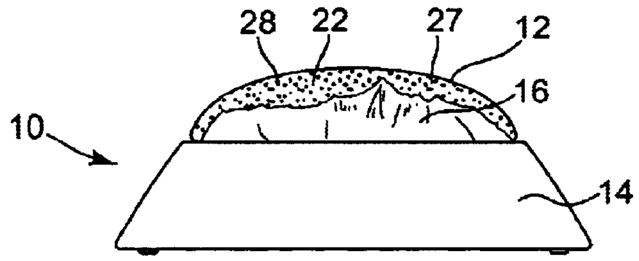
FIG. 2 is a schematic side view of the visual display device of FIG. 1 and showing in particular a three-dimensional replica of a geographic region positioned within the enclosure in accordance with the present invention.
Figure 3:
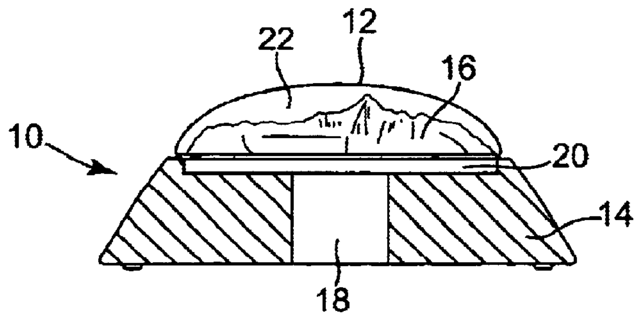
FIG. 3 is a schematic partial cross-sectional side view of the visual display device of FIGS. 1 and 2 taken on the line 3—3 showing in particular the enclosure positioned within a cutout region of the base in accordance with the present invention.
Figure 4:
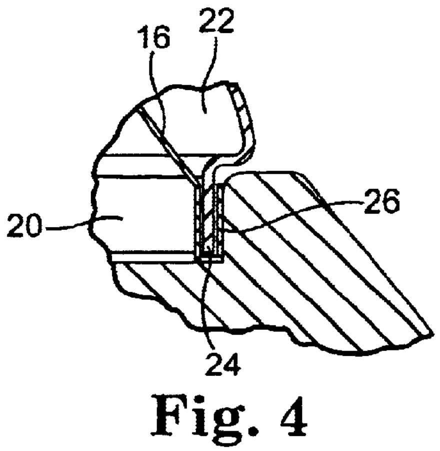
FIG. 4 is a schematic partial cross-sectional view of the visual display device of FIG. 3 showing in particular a rim of the enclosure engaged with a channel of the three-dimensional replica of a geographic region in accordance with the present invention and showing the enclosure positioned within the cutout region of the base.

In FIGS. 1–4, a preferred embodiment of a display device 10 made in accordance with the present invention is shown. A top view, side view, and a side cross-sectional view of the display device 10 are shown schematically in FIGS. 1, 2, and 3 respectively. In FIG. 4, a portion of the side cross-sectional view of FIG. 3 is shown in more detail. The display device 10 preferably includes an enclosure 12 coupled to a base 14 and a three-dimensional replica of a geographic region 16 positioned within the enclosure 12. The display device 10 also preferably includes a fluid that at least partially fills the enclosure 12 and optionally also may include dispersible media 28 capable of simulating a snowstorm or the like. The enclosure 12, base 14, the three-dimensional replica of a geographic region 16, and the fluid and dispersible media 28 are each described in detail below.

As can be seen best in FIGS. 1 and 2, the base 14 of the exemplary display device 10 is generally elliptical as viewed from the top (FIG. 1) and has angularly disposed sides as viewed from the side (FIG. 2) thereby forming a three-dimensional body similar in shape to a truncated egg. It is contemplated that the base 14 may have a variety of different shapes and designs, e.g. oval, round, square, rectangular, irregular, as well as variations and combinations of such shapes and designs. For example, the base 14 may include straight sides or decorative sides or the like. In a preferred aspect of the present invention, the base 14 may be about 0.5 inches to about 30 inches in length and more preferably about 10 inches to about 15 inches in length. Also, a preferred base 14 may be about 0.5 inches to about 30 inches in width and more preferably about 2 inches to about 10 inches in width. The height of a preferred base 14 may be about 0.2 inches to about 10 inches and more preferably about 1 inch to about 5 inches. In an aspect of the present invention the base 10 may be generally round or partially spherically shaped. An exemplary round base 10 may be about 0.5 inches to about 30 inches in diameter and more preferably, about 2 inches to about 15 inches in diameter.

Referring to FIG. 3, the base 14 is shown in cross-section. Preferably, the base includes an optional cavity 18 for positioning a mixing device (not shown) for agitating or otherwise mixing a fluid 27 including dispersible media 28 so as to disperse media 28 throughout the volume of fluid 27. Mixing may occur for a brief period, continuously, or intermittently as desired. The effect is visually appealing and, in some embodiments, simulates a snowstorm or the like. It is contemplated that the cavity 18 and the mixing device for simulating a snowstorm or the like may be omitted from the display device 10 for certain applications. If omitted, shaking the display device 10 to agitate the fluid and the dispersible media 28 may generate a simulated snowstorm or the like.

The base 14 preferably includes a cutout region 20. The cutout region 20 may be used, for certain applications, for mounting and positioning the enclosure 12 with respect to the base 14. Such mounting and positioning is described in more detail below. It is noted that the cutout region 20 may be any structure that allows the enclosure 12 to be registrably assembled with respect to the base 14 such that the functional aspects of the present invention are accomplished. For example, the cutout region 20 may be a recessed region as illustrated or may comprise any structure for assembling the enclosure 12 to the base 14 such as by a press or snap-fit, screws, optional gasket (not shown), or by gluing or welding etc.

The base 14 may be formed from any suitable material or combination of materials. For example, the base 14 may be formed from solid wood, which wood may be indigenous to the geographic region displayed by the display device 10. Such wood may include pine, maple, birch, and cherry as well as many others. Also, the base 14 may be formed from laminated wood such as solid core Russian plywood, marine plywood, and the like. Additionally, other materials representative of the displayed geographic region may be used such as natural or synthetic rock or stone including granite, quartz, and marble. In another aspect of the present invention, the base 14 may be formed from one or more metals, intermetallic compositions, and/or alloys such as stainless steel or aluminum or may be formed from one or more polymers, water proofed paper mache, and the like. The base 14 may be formed by any appropriate fabrication technique including, but not limited to, hand carving, machining, injection molding or other molding technique(s), forging, and casting. It is contemplated that the base 14 may be formed as one part or may be formed as a plurality of parts, which may be assembled to form base 14 in accordance with the present invention. If desired, the base 14 may include additional features such as nameplates, receptacles for souvenirs such as souvenirs that are representative of the displayed geographic region, as well as decorative moldings, optional texture, etchings, or carvings.

Now referring mainly to FIGS. 1 and 2, the exemplary enclosure 12 is preferably elliptically shaped as viewed from the top (FIG. 1) and dome shaped as viewed from the side (FIG. 2). In an aspect of the present invention a preferred enclosure 12 is generally spherically shaped. Of course the enclosure 12 may comprise any shape such as square, rectangular, round, or complex combinations of shapes. Generally, a preferred appearance may be accomplished wherein the shape of the enclosure 12 correlates, at least generally, with the shape of the base 14 as in the exemplary display device 10 shown in FIGS. 1 and 2. It is contemplated, however, that the shape of the base 14 and the shape of the enclosure 12 may be different from each other. And, alternatively the base 14 may be omitted from the display device 10 in certain aspects of the present invention. That is, a display device 10 in accordance with the present invention may include an enclosure 12 and a three-dimensional replica of a geographic region 16 without a separate base structure attached thereto. In such embodiments, part of the enclosure 12 and/or the three-dimensional replica of a geographic region 16 function as the base 14.

In a preferred aspect of the present invention, the enclosure 12 may be formed from a transparent material such as glass, quartz, acrylic, polycarbonate or other polymer and preferably includes an interior space 22. Preferably, the interior space 22 is capable of having a fluid sealed within at least a portion of the interior space 22 as is described in more detail below. A preferred enclosure 12 is formed from a substantially transparent, glass containing material, which has a generally uniform wall thickness of about one-sixteenth of an inch thereby defining the interior space 22.

The enclosure 12, for certain applications, may be frosted, colored, etched, engraved, painted or otherwise ornamentally decorated or altered in any desired way over at least a portion of its surface. It is further contemplated that the enclosure 12 may include patterns, or markings with decorative elements, graphics, or alphanumeric information incorporated directly into the material of which the enclosure 12 is formed and/or formed separately and attached to the enclosure 12. For certain aspects of the present invention, it is contemplated that the enclosure 12 may include portions thereof, which are non-transmissive of light or partially transmissive of light as long as at least a portion of the enclosure is at least partially transmissive of light. Also, it is contemplated that the enclosure may be formed from any material, either known or developed, and that the interior space 22 may comprise any shape and size in accordance with the present invention. That is, the enclosure 12 does not need to have a uniform wall thickness defining the sealable interior space 22. Further, the enclosure 12 may be formed from multiple pieces, which are attached or sealed together in accordance with the functional aspects of the present invention.

As introduced above, the display device 10 preferably includes at least one three-dimensional replica of a geographic region 16, the preferred fabrication of which is described in detail below. As can be seen in FIG. 2 and in cross-section in FIG. 3. the three-dimensional replica of a geographic region 16 is positioned within the interior space 22 of the enclosure 12 so that at least a portion of it is viewable from outside of the enclosure 12. Alternatively, the enclosure 12 and the three-dimensional replica of a geographic region 16 may be formed as an integral unit (or the base 14 and the three-dimensional replica of a geographic region 16 may be formed as an integral unit).

Preferably, the exemplary enclosure 12 includes a rim 24 as can be seen best in FIG. 4. It is contemplated that for certain applications the rim 24 may alternatively comprise an edge, surface, channel or groove, or lip, or any other structure in accordance with the present invention. The rim 24 preferably fits within and engages with an engagement portion 26 of the three-dimensional replica of a geographic region 16. As can be seen in FIG. 4, the engagement portion 26 of the three-dimensional replica of a geographic region 16 generally comprises an annular channel or groove, which may receive the rim 24 of the enclosure 12. However, the engagement portion 26 may comprise an edge, surface, or lip or any other similar structure. Accordingly, the rim 26 may be coupled to the engagement portion 26 and sealed thereto with a suitable fluid resistant sealant and/or glue such as silicone, or epoxy, polyurethane, or the like. It is contemplated that any structure may be used as the rim 24 and engagement portion 26 such that the enclosure 12 and the three-dimensional replica of a geographic region 16 may be coupled in accordance with the present invention. For example, an interference fit, snap-fit, or releasable type structure may be used. It is further contemplated that the three-dimensional replica of a geographic region 16 may be attached to at least a portion of the base 14 and positioned within the enclosure 12. That is, the three-dimensional replica of a geographic region 16 does not need to be attached to the enclosure 12. Also, the three-dimensional replica of a geographic region 16 may positioned within the enclosure 12 without being attached to the base 14 or the enclosure 12.

Also, interior space 22 of the enclosure 12 is at least partially filled with a fluid. This can be accomplished in any desired way. For example, the enclosure 12 can be at least partially filled with fluid by inverting the enclosure 12 and filling the enclosure 12 with a desired amount of a fluid, such as distilled water, along with about one drop of glycerin and any other desired conventional additives or particulate matter such as a dispersible media 28. Next, a bead of a suitable sealant, which is resistant to the particular fluid being used (e.g. waterproof if the fluid is aqueous), is preferably placed on the engagement portion 26 of the three-dimensional replica of a geographic region 16 or on the rim 24 of the enclosure 12. The three-dimensional replica of a geographic region 16 can then be installed into the enclosure 12 while allowing excess fluid, if any, to be displaced out of the enclosure 12, thereby engaging the engagement portion 26 and the rim 24 and forming a fluid-tight seal. The engagement portion 26 and the rim 24 may be appropriately clamped if necessary until the seal is cured. It is contemplated, additionally, that any technique may be used to fill the interior space 22 of the enclosure 12 with a fluid. For example, a fill port may be provided in the device 10 or in the three-dimensional replica of a geographic region 16 for filling the interior space 22 of the enclosure 12 for certain applications. In this approach, the three-dimensional replica of a geographic region 16 forms part of the enclosure 12 and functions as a closure. It is understood that for certain applications the three-dimensional replica of a geographic region 16 may be at least partially attached to the base 14.

Additionally, the enclosure 12 having the three-dimensional replica of a geographic region 16 attached thereto may be coupled with the base 14 by attaching the enclosure 12 to the base 14 by using an appropriate glue, epoxy, or mechanical fastening technique. Preferably, the size and shape of the rim 24 of the enclosure 12 substantially corresponds with the size and shape of the cutout region 20 of the base 14. That is, for the exemplary display device 10 shown in FIGS. 2 and 3, the rim 24 is generally elliptically shaped and the cutout region 20 is also generally elliptically shaped such that the rim 24 may fit into the cutout region 20 and be secured thereto if desired. Alternatively, the enclosure 12 may simply rest on the base 14 without being attached to the base 14 or may be displayed alone without using the base 14.

Additionally, the optional dispersible media 28 to simulate snow or the like may be included if desired. Such dispersible media 28 preferably have characteristics, e.g. density, shape, etc., that allow the dispersible media 28 to be suspended for prolonged periods when dispersed in the fluid. It is contemplated that the dispersible media 28 may comprise shapes or be in the form of objects representative of or otherwise corresponding to the realistically proportional replica of a geographic region 16, such as golf balls in the case of a replicated golf course or portion thereof. Other examples may include baseballs, footballs, soccer balls, figurines, skis, ski boots, or the like.

In a preferred aspect of the present invention, the three-dimensional replica of a geographic region 16 can be formed by utilizing contour or elevation data from a natural or fictional (or proposed) geographic region or regions or portion(s) thereof. Such geographic region(s) may include but are not limited to all or a portion of existing or proposed parks, golf courses, ski slopes, mountain ranges and canyons, river valleys, real estate developments, as well as many others. In an aspect of the present invention, portions of certain geographic regions may be replicated to form related sets of a certain geographic site.

Once a geographic region to be replicated is identified, elevation data, which is representative of the topography of the geographic region, is preferably obtained from a suitable source such as from the U.S. Forest Service or from the U.S. Ground Service. Also, such elevation data may be obtained from aerial photography or from telemetry services. Typically, such contour or elevation data associated with a particular geographic region accurately represents the terrain or topography of the geographic region and may be used, in an aspect of the present invention, to form a realistically proportional replica of the geographic region as described below. It is contemplated however, that a three-dimensional replica of a geographic region may be formed having any desired proportionality. For example, a three-dimensional replica may be realistically proportional so that the three-dimensional replica is a scaled representation of the actual geographic region or the three dimensional replica may be altered, such as by stretching, compressing, or otherwise distorting the three dimensional replica in some aspect to form a modified version of an actual geographic region.

A three-dimensional replica of a geographic region may be formed wherein the three-dimensional replica of a geographic region comprises surface features that correspond to the topographical data indicative of the three-dimensional topography of the geographic region. This data may include data derived from contour, elevation, or survey maps or may be data obtained through GPS or other similar positioning/mapping systems. Generally, such data may be in alternative formats, for example, DEM or other three-dimensional vector imagery. It is contemplated that any data, which is indicative of the terrain, topography, or surface characteristics of the geographic region, may be used. Additionally, other information such as photographs, either aerial or otherwise, and descriptions and/or measurements of specific features and elements of the geographic region may be obtained as needed to assist in forming the three-dimensional replica of the geographic region.

The above-described data is preferably used to direct a machine to form a three-dimensional replica of the desired geographic region. Preferably, the three-dimensional replica of a geographic region 16 is formed by using information comprising topographical data for the desired geographic region(s). The three-dimensional replica of a geographic region may be formed by hand by using such information, such as by carving or the like. More preferably, the three-dimensional replica of a geographic region 16 is formed by an automated process using a suitable system that can fabricate three-dimensional structures using electronic data that defines the structure. Widely known and commercially available services are available and are generally referred to as Rapid Prototyping Systems, 3-D modeling systems, concept modeling systems, etc. Examples include Iron CAD and Gibs CAM software and systems. Such systems and techniques are also described in U.S. Pat. No. 5,136,515 to Helinski, U.S. Pat. No. 5,740,051 to Sanders, Jr. et al., and U.S. Pat. No. 6,143,852 to Harrison et al.

For certain application, the data may be used directly by the machine, however, the data may be converted from one format to another so as to be useable by a particular machine. That is, depending upon the form in which topographical data is obtained or gathered, it may need to be converted into a format understandable by the machine.

In one preferred aspect of the present invention an original or master three-dimensional replica of a geographic region may be formed by any of the above-described techniques and may then be used to form a mold for mass-producing the realistically proportional replica of a geographic region. For example, a mold may be formed from an original three-dimensional replica of a geographic region so that any suitable manufacturing process such as injection molding or the like can be used to form copies of the original realistically proportional replica of a geographic region. It is contemplated, however, that a suitable manufacturing process need not replicate a master and may manufacture an original as each mass produced unit.

In an additional aspect of the present invention, the three-dimensional replica of a geographic region 16 may include realistically colored, decorated, or otherwise enhanced portions thereof. Preferably, such colored portions generally substantially correspond to the actual (or proposed) geographic region to achieve a desired degree of realism. For example, for a geographic region such as a golf course, the colors of the grass and the sand traps may be added to the three-dimensional replica of a geographic region 16 by any suitable known or developed technique. In one aspect of the present invention, such colors may be painted on by using a hand technique such as brush painting or by using appropriately formed stamps or pads to imprint a desired color, including texture, to portions of the three-dimensional replica of a geographic region 16. In another aspect of the present invention a machine may be used to add color to the three-dimensional replica of a geographic region 16 in accordance with the present invention. Such machines may include, but are not limited to, ink-jet or other similar printers, screen-printing machines, and the like. In one aspect of the present invention an overlay technique may be used to accurately print a photographic image onto a surface of the three-dimensional replica of a geographic region 16. In one such technique, a photographic image may be directly printed, by ink-jet printing or the like, onto the surface of the three-dimensional replica of a geographic region 16. One such photographic overlay printing service is available from Solid Terrain Modeling of Fillmore, Calif. It is contemplated that any technique to accurately overlay an image, such as an aerial photograph, other graphic image, or the like, onto the three-dimensional replica of a geographic region 16 may be used.

In yet another aspect of the present invention, the three-dimensional replica of a geographic region 16 may include three-dimensional objects, which are representative of the actual geographic region. For example, man-made structures or formations such as buildings and bridges and the like may be formed by any suitable technique and attached or glued to or otherwise incorporated with the three-dimensional replica of a geographic region 16. Additionally, such three-dimensional objects may comprise living as well as non-living naturally occurring geographic forms such as trees and plants, waterfalls, rock formations, etc. Text such as topographical elevation information or numbered contours which are representative of the geographic region may also be included as part of the three-dimensional replica of a geographic region 16.

Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A visual display device for displaying a three-dimensional replica of a geographic region, the visual display device comprising:

an enclosure having an interior space wherein at least a portion of the enclosure is at least partially transmissive of light;

a three-dimensional replica of a geographic region positioned at least partially within the interior space of the enclosure so that the three-dimensional replica of a geographic region is at least partially viewable through the portion of the enclosure that is at least partially transmissive of light wherein the three-dimensional replica of a geographic region comprises surface features proportionally corresponding to topographical data indicative of the three-dimensional topography of the geographic region; and a fluid at least partially filling the interior space of the enclosure.

2. The visual display device of claim 1, wherein the three-dimensional replica of a geographic region is a realistically proportional three-dimensional replica of a geographic region.

3. The visual display device of claim 1, wherein the enclosure includes an opening, which opening is in communication with the interior space of the enclosure.

4. The visual display device of claim 3, wherein the opening of the enclosure includes an engagement portion thereof capable of engaging with an engagement portion of the three-dimensional replica of a geographic region and forming a seal therebetween.

5. The visual display device of claim 4, wherein the engagement portion of the enclosure and the engagement portion of the three-dimensional replica of a geographic region comprise a lip and a groove respectively, which lip and groove are capable of forming a seal therebetween.

6. The visual display device of claim 4, wherein the engagement portion of the enclosure and the engagement portion of the three-dimensional replica of a geographic region comprise a groove and a lip respectively, which groove and lip are capable of forming a seal therebetween.

7. The visual display device of claim 1, wherein the enclosure is formed from a glass containing material.

8. The visual display device of claim 1, wherein the enclosure is formed from a polymer containing material.

9. The visual display device of claim 1, wherein the three-dimensional replica of a geographic region includes colored portions thereof, which colored portions generally substantially correspond in color and location to colored portions of the geographic region.

10. The visual display device of claim 1, wherein the three-dimensional replica of a geographic region further includes three-dimensional objects representative of the geographic region attached thereto.

11. The visual display device of claim 10, wherein the objects representative of the geographic region include replicas of man-made structures found at the geographic region.

12. The visual display device of claim 10, wherein the objects representative of the geographic region include naturally occurring nonliving geographic forms.

13. The visual display device of claim 10, wherein the objects representative of the geographic region include naturally occurring living geographic forms.

14. The visual display device of claim 1, wherein the fluid comprises water.

15. The visual display device of claim 1, further comprising dispersible media positioned within the enclosure.

16. The visual display device of claim 15, wherein the dispersible media comprises objects representative of the geographic region.

17. The visual display device of claim 15, further including a device capable of at least partially dispersing the dispersible media throughout the fluid within the enclosure.

18. The visual display device of claim 1, further including a base for supporting and positioning the enclosure.

19. The visual display device of claim 18, wherein the base includes a cutout region capable of engaging with at least a portion of the enclosure.

20. The visual display device of claim 18, wherein the base includes an opening capable of receiving and positioning a device capable of at least partially dispersing the dispersible media throughout the fluid within the enclosure.

21. A method for forming a visual display device comprising the steps of:

providing an enclosure having an interior space wherein at least a portion of the enclosure is at least partially transmissive of light;

using information comprising data indicative of the three-dimensional topography a geographic region to fabricate a three-dimensional replica of a geographic region;

positioning the three-dimensional replica of a geographic region at least partially within the interior space of the enclosure so that the three-dimensional replica of a geographic region is at least partially viewable through the portion of the enclosure that is at least partially transmissive of light; and filling the interior space of the enclosure with a fluid.

22. The method of claim 21, further including the step of sealing the interior space of the enclosure.

23. The method of claim 22, wherein the step of sealing the interior space of the enclosure comprises sealing at least a portion of the three-dimensional replica of a geographic region to at least a portion of the enclosure to seal the interior space of the enclosure.

24. The method of claim 21, further comprising the step of attaching the enclosure to a base for positioning and supporting the enclosure thereon.

25. The method of claim 21, wherein the fluid of the step of filling the interior space of the enclosure with a fluid comprises water.

26. The method of claim 21, further including the step of adding dispersible media within the interior space of the enclosure.

27. The method of claim 21, further including the step of adding color to at least a portion of the three-dimensional replica of a geographic region.

28. The method of claim 27, wherein the step of adding color comprises hand painting at least a portion of the three-dimensional replica of a geographic region.

29. The method of claim 27, wherein the step of adding color comprises machine painting at least a portion of the three-dimensional replica of a geographic region.

30. The method of claim 21, further including the step of attaching objects representative of the geographic region to the three-dimensional replica of a geographic region.

31. The method of claim 21, wherein the step of using information comprising data indicative of the three-dimensional topography of a geographic region comprises using elevation data.

32. The method of claim 21, wherein the step of using information comprising data indicative of the three-dimensional topography of a geographic region comprises using a contour map to determine the three-dimensional topography of the geographic region.

33. The method of claim 21, wherein the step of using information comprising data indicative of the three-dimensional topography of a geographic region comprises using data from a global positioning system to determine the three-dimensional topography of the geographic region.

34. The method of claim 21, wherein the step of using information comprising data indicative of the three-dimensional topography of a geographic region comprises using data from aerial photographic information to determine the three-dimensional topography of the geographic region.

* * * * *